United States Patent
Kitchin et al.

(10) Patent No.: US 8,135,127 B2
(45) Date of Patent: Mar. 13, 2012

(54) METHOD AND APPARATUS FOR DETECTING AND RESPONDING TO EVENTS OCCURRING ON REMOTE TELEPHONE

(75) Inventors: Dwight W. Kitchin, Parker, CO (US); Scott D. Passe, Forney, TX (US)

(73) Assignee: Securus Technologies, Inc., Dallas, TX (US)

( * ) Notice: Subject to any disclaimer, the term of this patent is extended or adjusted under 35 U.S.C. 154(b) by 1318 days.

(21) Appl. No.: 11/283,559

(22) Filed: Nov. 17, 2005

(65) Prior Publication Data
US 2007/0116214 A1    May 24, 2007

(51) Int. Cl.
*H04M 9/00* (2006.01)

(52) U.S. Cl. .......................... 379/350; 379/32
(58) Field of Classification Search ............... 379/200, 379/360, 361, 377, 396, 145, 114.14, 27.03, 379/32
See application file for complete search history.

(56) References Cited

U.S. PATENT DOCUMENTS

| | | | | |
|---|---|---|---|---|
| 3,573,611 | A | * | 4/1971 | Bergemann et al. ......... 324/621 |
| 4,680,783 | A | * | 7/1987 | Boeckmann .................... 379/30 |
| 4,961,644 | A | * | 10/1990 | Marsden ....................... 356/73.1 |
| 5,319,702 | A | | 6/1994 | Kitchin et al. |
| 5,465,287 | A | * | 11/1995 | Egozi ......................... 379/22.02 |
| 5,504,810 | A | | 4/1996 | McNair |
| 5,539,812 | A | | 7/1996 | Kitchin et al. |
| 5,649,002 | A | * | 7/1997 | Brady et al. ............. 379/142.01 |
| 5,768,355 | A | | 6/1998 | Salibrici et al. |
| 6,141,406 | A | | 10/2000 | Johnson |
| 6,895,086 | B2 | * | 5/2005 | Martin ........................... 379/189 |
| 7,123,704 | B2 | | 10/2006 | Martin |
| 7,136,471 | B2 | | 11/2006 | Johnson |
| 2007/0206761 | A1 | * | 9/2007 | Anders et al. ............ 379/207.01 |

OTHER PUBLICATIONS

U.S. Appl. No. 60/617,944.*
Ahonen, J. et al., "Realtime Speech and Voice Trasmission on the Internet::" Helsinki University of Technology, Apr. 1997, [online] Retrieved from the Internet:<URL:http://www.tml.hut.fi/Opinnot/Tik-110.551/1997/seminar_paper.html>.
Engdahl, T., "Telephone Line Audio Interface Circuits," 1996-2001, [online] Retrieved from the Internet<URL:http://www.hut.fi/Misc/Electronics/circuits/teleinterface.html>.
Engdahl, T., "Telephone Ringing Circuits," 1997, 2000, [online] Retrieved from the Internet<URL:http://www.hut.fi/Misc/Electronics/circuits/telephone_ringer.html>.
Melanson, M., Simple Time Domain Audio Coding, Jun. 8, 2003, [online] Retrieved from the Internet<URL:http://home.pcisys.net/~melanson/codecs/simpleaudio.html>.
"Sub-Band Coding," Otolith, Oct. 18, 1995, [online] Retrieved from the Internet<URL:http://www.otolith.com/otolith/olt/sbc.html>.
Wenzel, T., "Bluetooth Audio Data Transfer Between Bluetooth Chipset (PMB6752&PMB6625) and TriCore Host TC1920," Application Note, v 1.0 Infineon Technologies, Oct. 2001, 10 pages.

\* cited by examiner

*Primary Examiner* — Walter F Briney, III
(74) *Attorney, Agent, or Firm* — Fenwick & West LLP (57) ABSTRACT

A process and a system are disclosed for detecting activity, e.g., three way calling, call forwarding, or the like, during a phone call. The process includes, and the system is configured for, establishing the call path between a first party and a second party, adding a reference tone to the call path, observing a reflected tone from the call path, and determining a relationship between the reference tone and the reflected tone. Information relating to the relationship may be reported for further analysis.

37 Claims, 10 Drawing Sheets

METHOD AND APPARATUS FOR DETECTING AND RESPONDING TO EVENTS OCCURRING ON REMOTE TELEPHONE

BACKGROUND OF THE INVENTION

1. Field of the Invention

The present invention generally relates to the field of telephone systems, and more specifically, to activity detection mechanisms in telephone systems.

2. Description of the Related Art

Subject to state Public Utility Commission regulations, ownership of Customer Owned Coin Operated Telephone (COCOT) service is permitted. An outgrowth of COCOT service has been the private operation of institutional telephone services. However, "privatization" of phone systems has created a number of technical challenges. Examples of challenges include automated detection of a called party's response to some appropriate prompt (such as, a request for acceptance of a collect call) by dialing a pulse-dial telephone and, in the case of prison systems, the prevention of three-way calling.

Coin telephones owned by local telephone companies generally utilize direct current (DC) signals to signal called-party-answer. This information is transmitted between telephone company central offices and then to the originating pay telephone telling it, in effect, to accept payment for the call. This information is not normally communicated to conventional, i.e., regular business and residential, telephones. Under some tariffs, some, but not all, of this information may be available to COCOT equipment.

Collect calls placed through COCOT equipment are typically handled by an automated operator service (AOS), thus providing the owner of the COCOT equipment with the ability to provide collect call service and bill users of that service for both intra- and inter-local access and transport area (LATA) calls. However, the use of an AOS for collect calls is expensive. In addition, in certain instances, there remains a possibility of fraudulent activity.

In many institutions the phone calls placed by a patient/client or prison inmate are primarily, if not exclusively, collect calls. Collect calls initiated by a patient/client must be indicated as such to the called party. In addition, calls placed by an inmate to an outside party often begin with a prerecorded message stating that the call or collect call is from "a prison" and is being placed by "prisoner's name." In the above cases the called party is usually asked to dial a digit, commonly a "0" or a "1", to accept the call or the attendant charges. The phone system providing such service must be able to detect such acceptance both as a dual-tone-multi-frequency (DTMF) tone response from a "touch-tone" phone as well as to detect the equivalent response on a pulse-dial telephone.

The clients/inmates in some institutions may be allowed to call only numbers on a pre-authorized list in order to deter fraudulent activity. Thus, a prison phone system, for example, must be able to detect the called party's flashing the hook switch in order to prevent the called party from activating three-way (i.e., conference) calling, dialing another number and then connecting the prisoner to an unauthorized phone number.

To address the problems described, conventional telephone call handling equipment automatically route local and long distant calls without the intervention of an outside service or live operator. This enables the telephone owner/service provider to charge for the completion of a call or collect call while providing an opportunity to prevent certain calls, e.g., three-way calling. To do this, such conventional systems were configured to detect "hook-flash" conditions, of which several methods of detecting a three-way call initiated by a hook-flash were known in the prior art.

The hook-flash results in a temporary disconnect and reconnect which can be observed as a momentary interruption of loop current at the telephone company central office. The loop current loss, however, is not observed elsewhere in the network nor is the loop current loss made known to the respective parties. Thus, this attribute of a hook-flash is only employed at the central office.

In addition, conventional approaches for detecting initiation of a three-way call have been disclosed in U.S. Pat. No. 5,319,702 (the '702 patent) and U.S. Pat. No. 5,539,812 (the '812 patent). The system disclosed in the '702 patent is based on analog technology and accurately detects a vast majority of attempted three-way calls. The system disclosed in the '812 patent is based on the detection of additional characteristics of the hook-flash signal and utilizes digital signal processing (DSP). The system disclosed in the '812 patent generally is more discerning of the attempted three-way call as well as further equipped to distinguish an attempted three-way call from other events that occur on the telephone line (such as, voice fluctuations, noises from physical contact, e.g. dropping or tapping, of the handset, etc.).

Yet another approach to three-way call detection was disclosed in U.S. Pat. No. 5,768,355 (the '355 patent). The system disclosed in the '355 patent established a baseline ambient, or background, noise level, and detected when the signal noise level dropped below the ambient noise level. When the current signal noise level dropped below the ambient noise level, the system assumed that the called party attempted a three-way conference call.

A problem, however, with this approach is that the ambient noise level during the call may change, which in turn, triggers the particular methodology resulting in a disconnected call. For example, consider an inmate placing a call from a prison phone system. This call is picked up by a person on the receiving end. If that person places the receiver down, e.g., to close a door, there may be a change in the ambient noise level, which results in a disconnected call. The problem is further exacerbated by the fact that re-establishing a call results in another connect charge or may result in the caller, i.e., the inmate, being prohibited from making any further calls for at least a specified period, e.g., one week, based on the phone system configuration and caller profile.

In addition, U.S. Pat. No. 5,504,810 (the '810 patent) discloses a telecommunications network using quasi-time domain reflectometry techniques to identify those telephone calls, which comprise multiple legs. Echo data is collected for the telephone call from a predetermined point in the network to a point where the call originated. The data is processed to generate an indication of whether the telephone call comprises multiple legs, thus identifying those calls most susceptible to unauthorized use. The indication that a telephone call comprises multiple legs is used together with call attribute information, such as whether the call is placed to an international destination, to determine whether a given multiple-leg call is a valid access to the communication system or potentially fraudulent.

However, a problem with this approach is that the '810 patent discloses a method to potentially detect fraudulent access to a telecommunication system. This method can be applied to detect unauthorized access to (ingress) the system from a point other than the point identified as an otherwise legitimate access point. This method provides no means to detect changes in call paths, particularly at the called party end, once the call has been established.

Hence, in view of the above, there is a need for a system and a process to detect and analyze particular signal characteristics that associate with particular activity within an established call in a telephone system so that subsequent analysis on those characteristics allows for evaluating whether an activity beyond the established call has taken place.

SUMMARY OF THE INVENTION

The present invention includes a process and a system for monitoring a telephone call between an A-party and a B-party to determine whether particular activity, e.g., three-way calling, or the like, has occurred during the present call. By way of example, in a conversation between an A-party and a B-party, the B-party may try establishing a three-way call with a C-party (third-party). The process and system are configured to detect and report such activity.

The process and the system are integrated in a communication system that includes the A-party, a detection system, a telecommunication system, the B-party, and optionally the C-party. The telecommunication system may be a public switched telephone network (PSTN), a private branch exchange (PBX) system, a voice-over Internet Protocol (VoIP) system, a cellular communication system, or the like.

In one embodiment the process (or appropriately configured system) includes establishing the call path between a first party and a second party, adding a reference tone to the call path, observing a reflected tone from the call path, and determining a relationship between the reference tone and the reflected tone. Information relating to the relationship may be reported for further analysis.

More particularly, the process (or appropriately configured system) maps the reference tone and summed reflected tones to the time domain. Thereafter, the process starts a timer at, for example, a negative going zero crossing of the reference tone and stops the timer at, for example, a negative going zero crossing of the summed reflected tone. The process then calculates a time difference with this data to provide the information on relationship between the reference tone and the reflected tone. The time difference information can then be treated as a phase indicator even though the information does not, and need not, represent any actual phase relationship between the reference tone and the summed reflected tone. Information relating to the phase indicator may then be analyzed to determine "abnormal" activity in an established call path.

The features and advantages described in the specification are not all inclusive and, in particular, many additional features and advantages will be apparent to one of ordinary skill in the art in view of the drawings, specification, and claims. Moreover, it should be noted that the language used in the specification has been principally selected for readability and instructional purposes, and may not have been selected to delineate or circumscribe the inventive subject matter.

BRIEF DESCRIPTION OF THE DRAWINGS

The invention has other advantages and features which will be more readily apparent from the following detailed description of the invention and the appended claims, when taken in conjunction with the accompanying drawings, in which:

DETAILED DESCRIPTION OF THE PREFERRED EMBODIMENTS

The Figures and the following description relate to preferred embodiments of the present invention by way of illustration only. It should be noted that from the following discussion, alternative embodiments of the structures and methods disclosed herein will be readily recognized as viable alternatives that may be employed without departing from the principles of the claimed invention.

Reference will now be made in detail to several embodiments of the present invention(s), examples of which are illustrated in the accompanying figures. It is noted that wherever practicable similar or like reference numbers may be used in the figures and may indicate similar or like functionality. The figures depict embodiments of the present invention for purposes of illustration only. One skilled in the art will readily recognize from the following description that alternative embodiments of the structures and methods illustrated herein may be employed without departing from the principles of the invention described herein.

In addition, the present invention is particularly suited for telephone systems used in environments such as public or private pay phones, prison systems, or other telephone systems that could be monitored to detect call path activities such as third-party calling and the like. Moreover, the present invention is configurable to adapt to conventional system such as those referenced in U.S. Pat. No. 5,319,702 (the '702 patent), and U.S. Pat. No. 5,539,812 (the '812 patent), the relevant portions of which are herein incorporated by reference.

By way of example, FIGS. 1a through 1d illustrate embodiments of a telephone communication system in accordance with the present invention. The telephone communication system includes an A-party telephone 110 (or simply A-party 110) and a B-party telephone 120 (or simply B-party 120) that are interconnected through a public switch telephone network (PSTN).

Figure 1A:
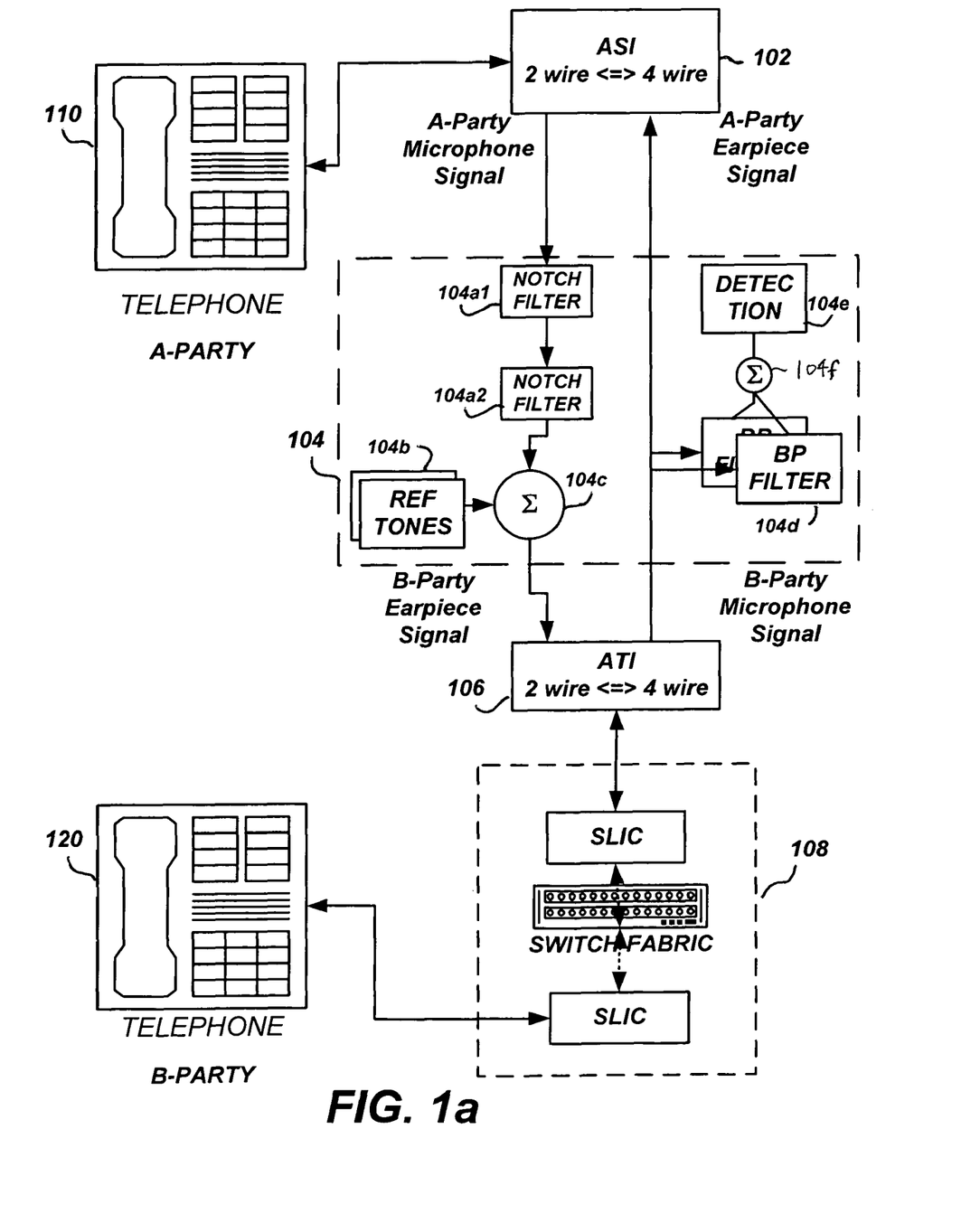
FIGS. 1a through 1d illustrate embodiments of a telephone communication system in accordance with the present invention.
Figure 1B:
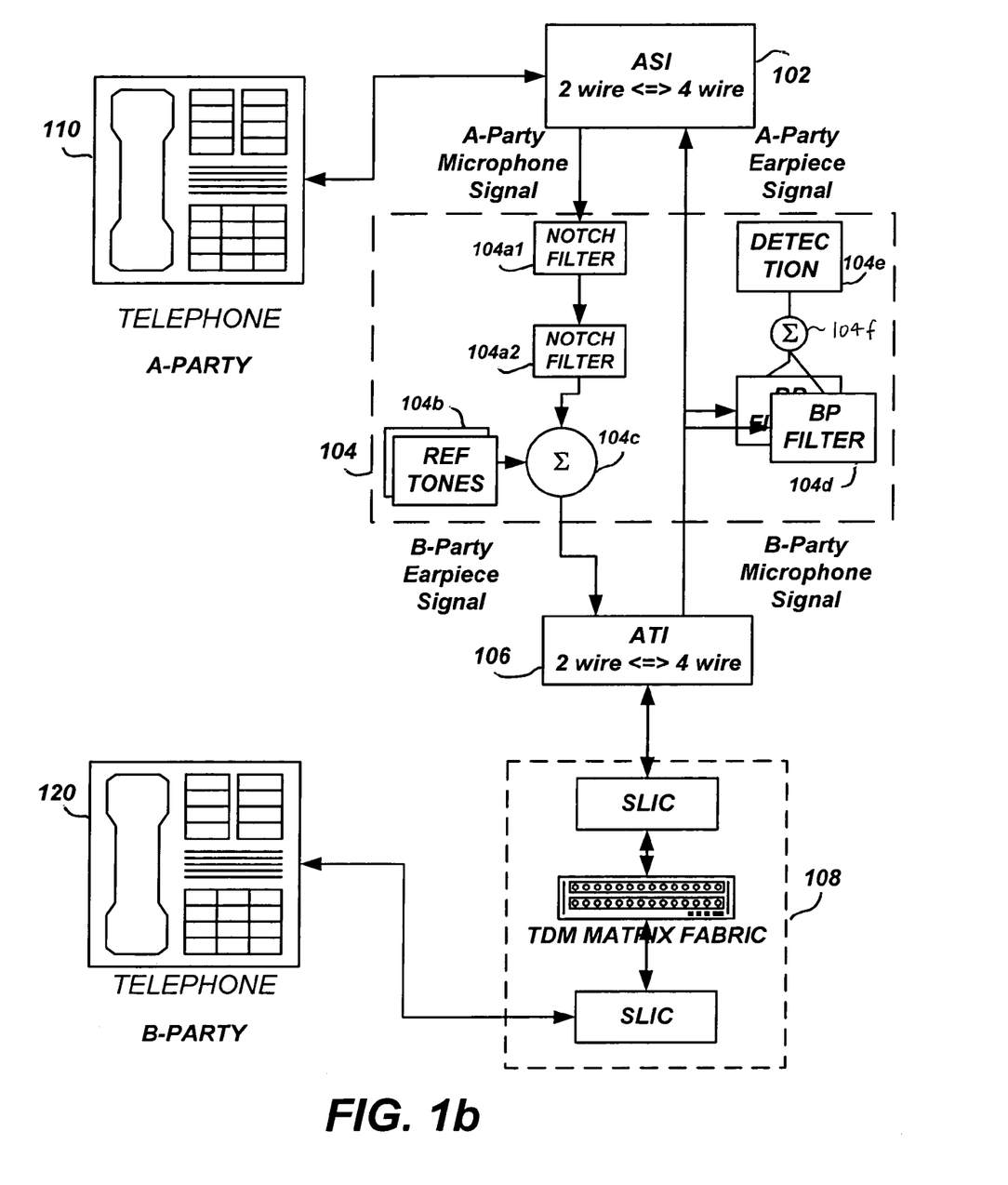

In FIGS. 1a and 1b, the A-party 110 communicatively couples with an analog station interface (ASI) 102, which communicatively couples with customer premise equipment 104. The customer premise equipment (CPE) 104 communicatively couples with an analog trunk interface (ATI) 106. The ATI 106 communicatively couples with the public switched telephone network (PSTN), which includes a class 5 central office, (generally 108). The PSTN 108 includes subscriber line interface circuits (SLICs) and an analog or digital switching matrix that interconnects appropriate SLICs. The B-party 120 communicatively couples a SLIC in the PSTN 108. In FIG. 1*a* the PSTN 108 includes a switch fabric and in FIG. 1*b* the PSTN 108*b* includes a TDM matrix fabric.

It is noted that the customer premise equipment 104 includes one or more notch filters 104*a*, one or more reference tone generators 104*b*, a summation module (or circuit) 104*c*, one or more band pass (BP) filters 104*d*, a detection module 104*e*, and a summation module (or circuit) 104*f*. The notch filters 104*a* are coupled in series. Specifically, a first notch filter 104*a*1 communicatively couples with the ASI 102 to receive microphone signals from the A-party telephone 110 (which are earpiece signals for the B-party 120). The first notch filter 104*a*1 filters the signal (e.g., filters a first frequency) and passes it on to a second notch filter 104*a*2. The second notch filter 104*a*2 further filters the signal (e.g., filters a second frequency) and forwards the signal to the summation module 104*c*. The summation module 104*c* is communicatively couples the one or more reference tone generators 104*b*. The summation module 104*c* is also communicatively couples with the ATI 106. In particular, the summation module 104*c* is configured to sum the signals from the notch filters 104*a*2 with reference tones from the one or more reference tone generators 104*b* and forward them to the ATI 106.

The customer premise equipment 104 also is configured to receive signals from the ATI 106 that originated from the B-party telephone 120. Specifically, the ATI 106 transmits the signals (which are microphone signals from the B-party 120) to the ASI 102 (which become earpiece signals for the A-party 110). This signal is tapped by the one or more band pass filters 104*d* and sent to the summation module 104*f* to sum the signal to the detection module 104*e*.

Those skilled in the art will appreciate that the summation module 104*f* can be implemented as shown in dual-frequency reference tone configurations. This is so that the detection module 104*e* can be presented with a composite reflected tone set similar to the composite tone set 705. Likewise, those skilled in the art will recognize that the function of the summation module 104*f* could also be computationally implemented within the detection module 104*e*. Thus, in dual frequency implementations, the detection module 104*e* would be able to observe and make decisions based upon characteristics of the entire envelope of the reflected tones as well as the characteristics of the individual tone components. It also is noted that operations of detection module if further described below with respect to single tone and multi-tone functional overviews.

Note that the path from the ATI (microphone signal path from B-party) 106 to the ASI (earpiece signal path for A-party) 102 may also include a set of one or more notch filters. In one embodiment, the one or more notch filters can be placed above the taps providing the B-party microphone signal to the inputs of the band pass filters. In this configuration the A-party will most likely not hear any reference or reflected tones. Likewise, although the B-Party may, at least briefly, notice the tone or tones (despite selection as non-intrusive tones), and may even mention "I think I hear a tone" to the A-Party (e.g., inmate) both parties may well assume that the tone heard by the B-party exists only on the B-party side, therefore interpreting the tone as being insignificant.

It is noted that in one embodiment, the notch filters 104*h* may be configured so that a first notch filter 104*h*1 communicatively couples the ATI 106 to receive and filter (e.g., filter a first frequency) a B-party microphone signal. A second notch filter 104*h*2 receives the filtered signal and filters it again (e.g., filter a second frequency) before passing the signal to the ASI 102 as an A-party earpiece signal for the A-party telephone 110.

In addition, the reference tone level, as perceived by the B-Party are at least 6 dBm lower level than at the point of generation (reference tone generator 104*b*) due to the expected termination loss of the terminating central offices 108, 109 this further minimizes the detection of the reference tone or tones by the parties to the call. As for the one or more notch filters in this configuration, in one embodiment they would be configured for the same frequencies as the one or more notch filters 104*a*. The actual level of attenuation may be less stringent for the additional set of notch filters due to the losses already incurred in the process of passing through the system from the generators to the B-Party and back again. Thus, in some embodiments this second set of notch filters could be computationally "cheaper" or programmatically identical to 104*a* thus incurring minimal additional code.

It is noted that in another alternative embodiment, a phase lock loop (PLL) 104*g* can be added after each band pass filter 104*d*, prior to summing the signal in the summation module 104*f*. These configurations are illustrated in FIG. 1*d*. In such embodiments, an appropriately configured phase lock loop (e.g., comprised of a gain-controlled PLL implementation) may allow for use of lower reference tone levels.

The controlled gain PLL may be implemented by a specific pair of two different types of PLL's for each test tone frequency being used in the overall system. In each PLL pair the "front" (preliminary) PLL has a relatively wide capture range but has a very tightly controlled output level for the signals that meet its capture criteria, while the "rear" (primary) PLL has a very narrow capture range to eliminate all but the specific frequency (for that PLL pair) of interest. A characteristic of narrow band PLL's is their requirement for a very fixed input level in order to provide the desired accuracy. Thus, the attendant requirement for the preconditioning PLL in front of the final discriminator PLL. It is noted that alternatively the PLL functions may be provided by digital functional equivalent, e.g., hardware DSP, or other logical implementations.

Figure 1C:
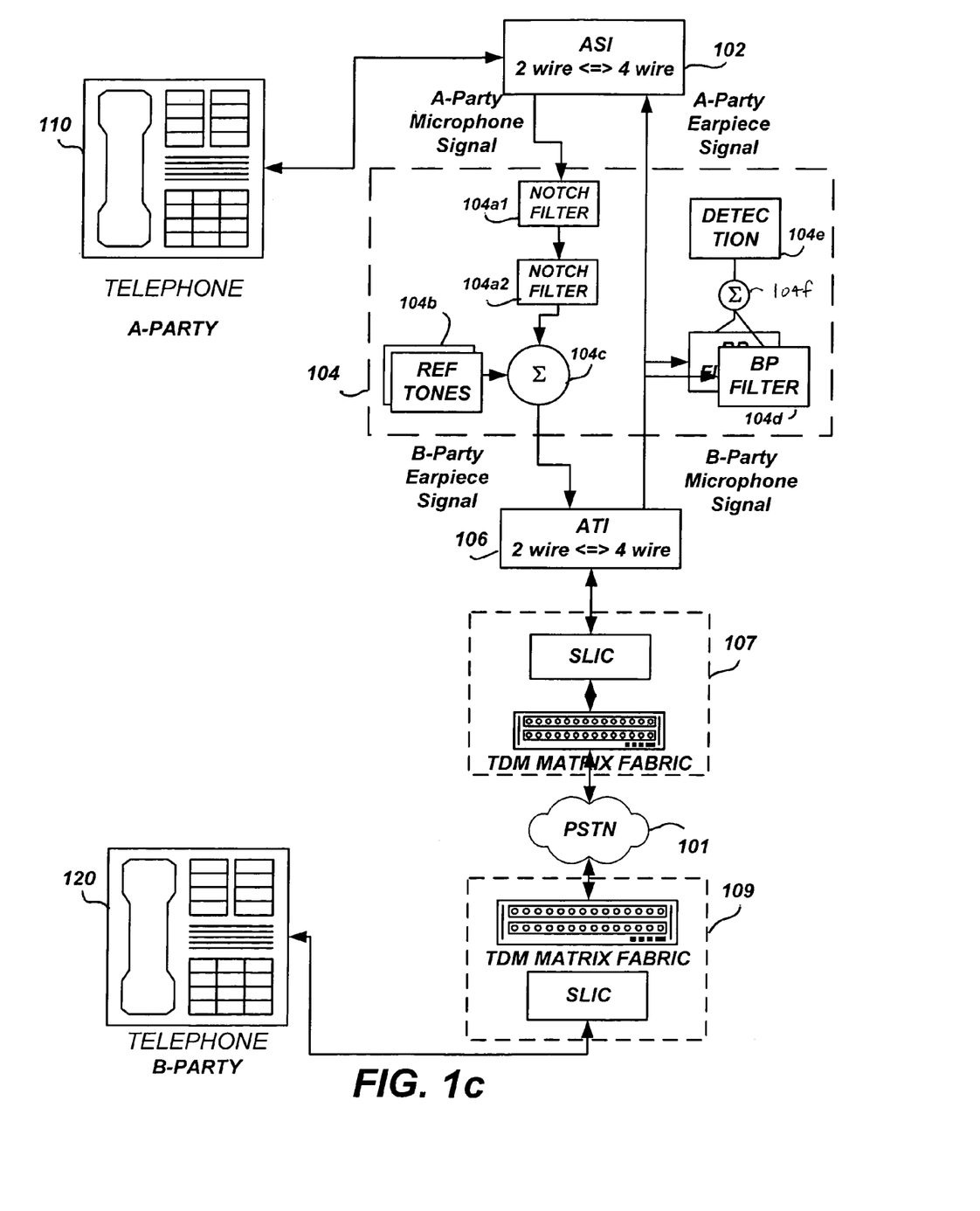
Figure 1D:
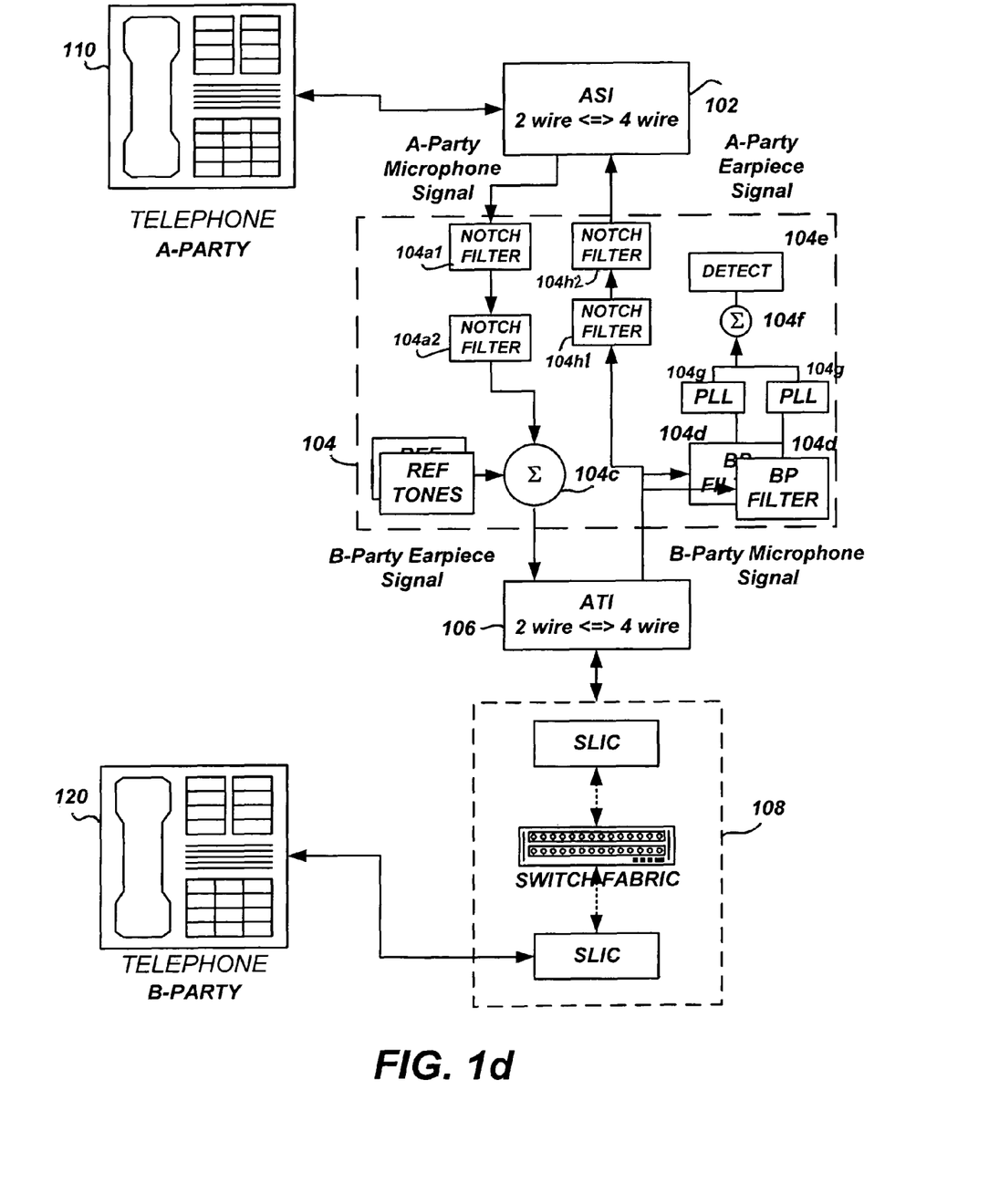

Referring next to FIG. 1*c*, it illustrates an alternative configuration of a conventional telephone system in which both the A-party 110 side and the B-party 120 side, relative to a PSTN 101, include a central office 107, 109. Each central office 107, 109 includes switching fabric that communicatively couple through the PSTN 101. The ATI 106 on the A-party side couples a SLIC in the central office 107 on its side and the B-party 120 couples a SLIC in the central office 109 on its side.

It is noted that the configuration of the customer premise equipment 104 illustrated in FIGS. 1*a* through 1*d* beneficially addresses problems of conventional customer premise equipment configurations. Specifically, conventional customer premise equipment configurations use band pass filters rather than notch filters for the A-party telephone 110 microphone signal path. The problem with such conventional configurations is that some voices transmitted through the A-party telephone 110 are almost entirely low frequency with relatively few high frequency components. Hence, a person at the B-party telephone 120 often has trouble hearing the voice and may be tempted to talk even louder thinking there is a bad connection. The problem is further exacerbated as the person at the A-party telephone 110 may then tend to speak even softer because they think that they may be talking too loudly hearing the raised voice from the B-party telephone 120.

To address this issue with conventional customer premise equipment, in one embodiment of the present invention, the customer premise equipment 104 is configured to include one or more notch filters 104*a* in the microphone signal path between the A-party telephone 110 and the B-party telephone 120. In particular, the customer premise equipment uses a reference tone generator 104*b*, which allows the notch filters 104*a* to isolate a particular and narrower range of frequencies for observation (and filtering). Specifically, one embodiment of the present invention is configured to identify characteristic reflections of a particular frequency that can be filtered through the notch filters rather than a broad range of frequencies that a high pass filter is configured to observe (and filter). In turn, this configuration reduces the ability of an A-party telephone 110 user (e.g., the calling party) to interfere with a detection process, for example, a detection process as outlined herein.

Referring to FIGS. 1*a* through 1*d* in general, those skilled in the art will understand that while the telephones 110, 120, and interface equipment 102, 106 are shown as analog equipment, these components may be of any technology appropriate for voice telecommunications. Similarly while the processing, switching, filtering, and detection equipment 104 is typically digitally implemented these functions may likewise be performed by any appropriate technology.

It also will be understood by those skilled in the art that the relationship depicted in FIGS. 1*a* through 1*d* is the interconnection of the elements and that the specific physical location of the elements is not a requirement for proper application of the teachings. For example, in FIG. 1*c*, the overall functions of elements 102, 104, 106 need not be located physically near telephone 110 in the traditional customer premise equipment arrangement. It is only required that the logical connection arrangement be preserved. For example, the addition of additional transport means between telephone 110 and an appropriate station interface 102 would permit the elements 102, 104, 106 to physically remote from telephone 110 without changing the functional operation of the system.

Note that interfaces 102, 106 need not be analog nor do they necessarily need to be time division multiplexed (TDM) because any portion of the system prior to the transport mechanism towards the B-Party 120, e.g., 106, 107, 101, is not necessary for the principles of the present invention to continue to be operable. Hence, the principles disclosed herein would be applicable to systems in which a different transport mechanism is used in place of, e.g., 106, 107, 101, for example in voice over packet or VoIP systems.

Monitoring System Architectural Overview

Figure 1E:
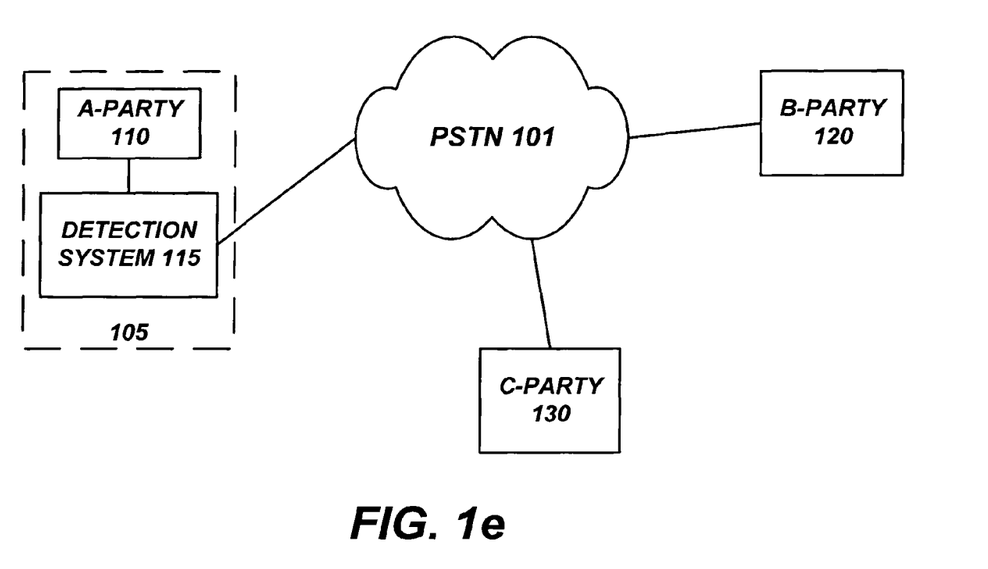
FIG. 1e illustrates an embodiment a communication system overview in accordance with the present invention.

FIG. 1*e* illustrates an embodiment of a monitoring system (and a process) for use in a communication system 101 in accordance with the present invention. Specifically, the monitoring system monitors a telephone call between the A-party 110 and the B-party 120 to determine whether a non-authorized activity has occurred during the telephone call between the party, for example, establishing a three-way call with a C-party (or third-party) 130.

In one embodiment, the monitoring system is configured for integration within or with the communication system 101. The communication system includes the A-party 110, a detection system 115, a telecommunication system 150, the B-party 120, and optionally the C-party 130. An example of a telecommunication system includes the PSTN 101 or a voice over packet-type system. In addition, the telecommunications system may be configured to operate within a private branch exchange (PBX), a voice over packet, a cellular communication environment, a combination of these or the like. In one embodiment, the detection system 115 may be configured within the customer premise equipment 104 on the A-party 110 side. Alternatively, the detection system 115 may be configured apart from customer premise equipment 104, although communicatively coupled to it.

Figure 1F:
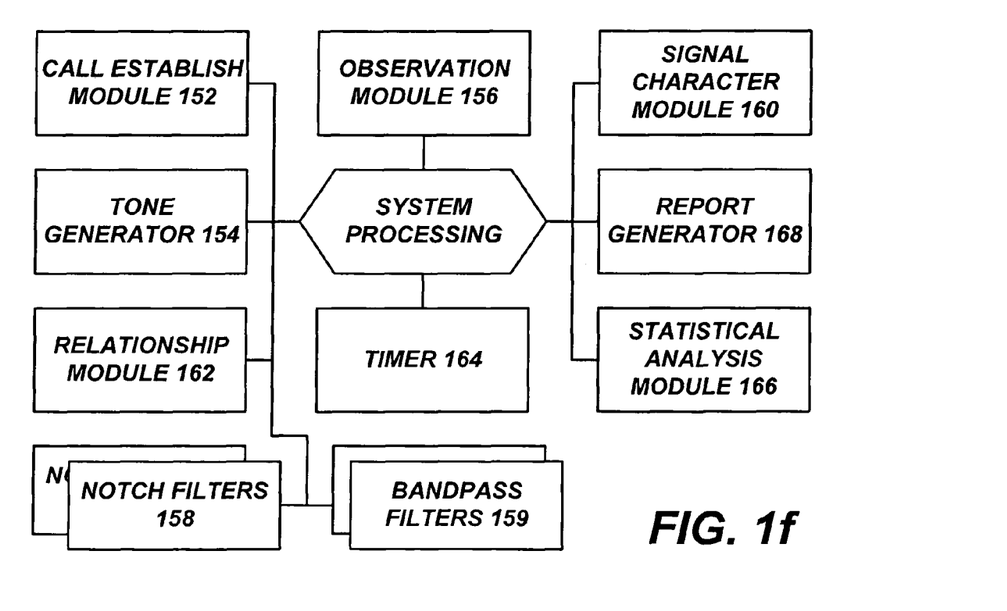
FIG. 1f illustrates one embodiment of a detection system in accordance with the present invention.

FIG. 1*f* illustrates an embodiment of the detection system 115 in accordance with the present invention. The detection system 115 includes a call establishment module 152, a tone generator 154, an observation module 156, one or more notch filters 158, a signal character module 160, relationship module 162, a timer 164, a statistical analysis module 166, and report generator 168. Each module/component is coupled through a system processing core 170, which includes a processor and/or controller and other components necessary for the detection system 115 to function as described herein. It is noted that the detection system 115 may be configured in software, in hardware, or a combination of software and hardware in a manner that achieves the functionality as described herein.

Functional Overview—Single Tone

Figure 2:
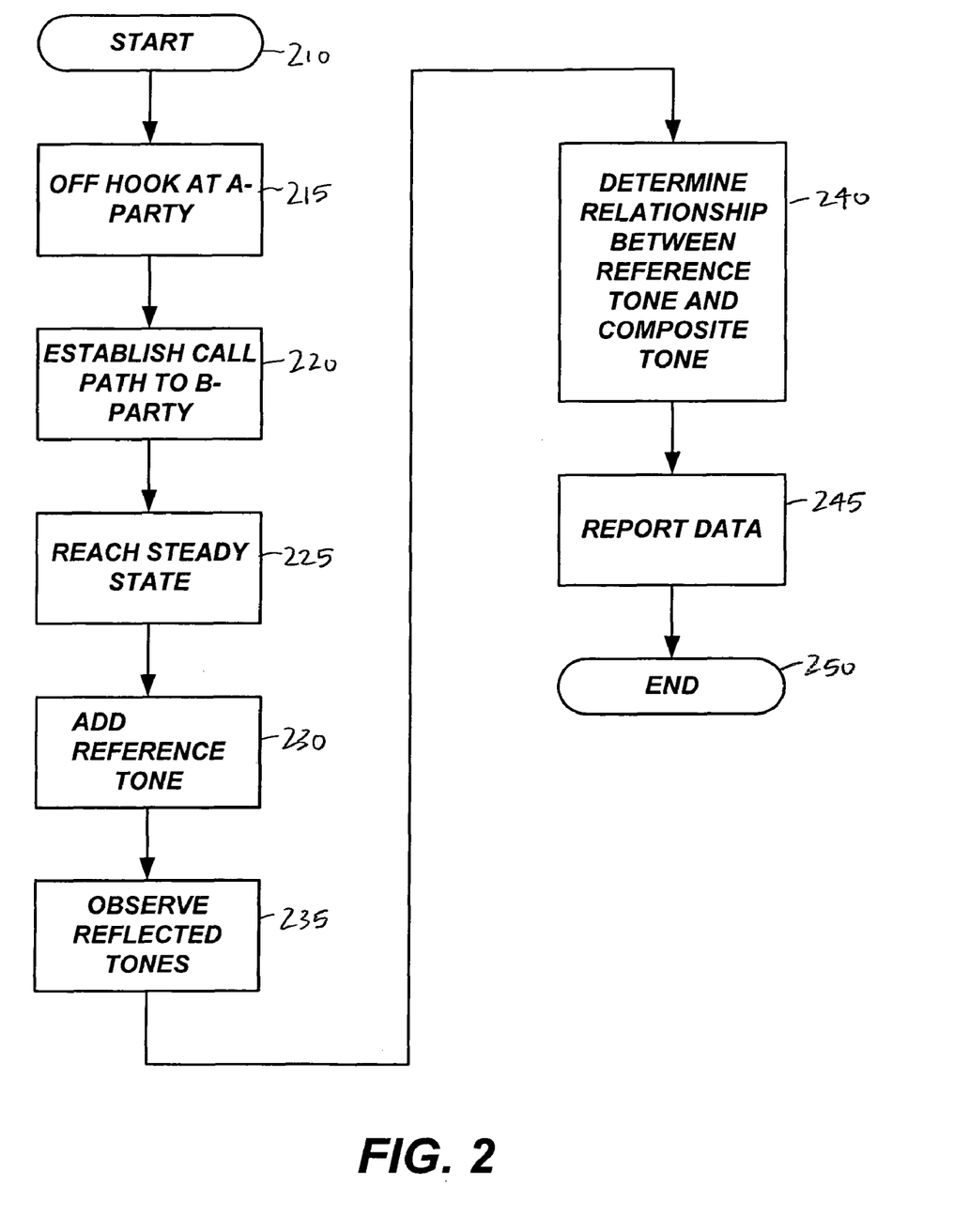
FIG. 2 illustrates one embodiment of a process for monitoring a communication system for a characteristic changes in a call path in accordance with the present invention.

FIG. 2 illustrates one embodiment of a process for monitoring a communication system for a characteristic changes in a call path in accordance with the present invention. Operationally, the process starts 210 and the A-party 110 goes off hook 215. The call establishment module 152 places a call through the telecommunications system (e.g., PSTN 101) to the B-party 120 to establish a call path 220.

Once the call reaches steady state 225 (e.g., established), the tone generator 154 adds a tone 230 in the call path from A-party to B-party. This tone may be referred to as a reference tone. A frequency of the reference tone may be predetermined, e.g., hard-coded, into the system or may be configurable, e.g., set by a user in hardware and/or software. Note that the tone is preferably selected to be non-intrusive and provides a reference in the direction from the A-party towards the B-party.

The tone may be a single tone or multi-tone. For a single tone, its frequency is preferably the lowest frequency that can be transmitted along the call path without significant attenuation. The single tone is also selected to be within a communication channel pass band. Lower tone frequencies, which are often within the frequency range of the human voice, are preferred over higher tones frequencies because lower tones frequencies generally are not intrusive within the minds of prospective callers. In addition to non-intrusiveness, lower tone frequencies, e.g., 200 Hertz (Hz) or 300 Hz, also offer advantages of higher (greater) resolution for signal analysis than higher tone frequencies, e.g., 3000 Hz or 3500 Hz. This higher resolution is due to a greater relative sampling rate available at lower frequencies as compared with the higher frequencies, with the common telecommunications sampling rate of 8 kilosamples per second.

With respect to an audio "level" (e.g., volume/power) of the reference tone(s), i.e., how "loud" the reference tone may be, it is noted that in one embodiment reference tone levels are on the order of −20 to −35 dBm0. In some embodiments, a preferred embodiment level may be approximately −30 dBm0 for at least a single frequency reference tone or the higher frequency tone of a dual or multiple frequency tone set. In embodiments involving a dual frequency reference tone, a level of the lower frequency tone can be selected, along with its frequency, which advantageously masks a perception of the tones by the participants on the call.

Figure 3:
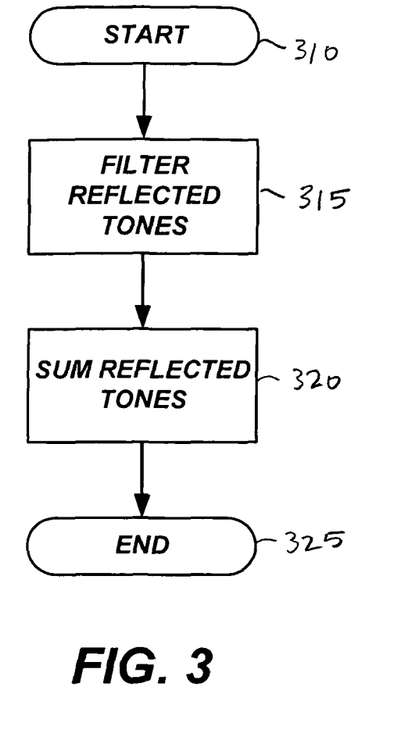
FIGS. 3 and 4 illustrate embodiments for processes to determine relationships between a reference tone and a reflected tone in accordance with the present invention.

Upon reaching steady state 225 and adding the reference tone 230 into the call path, e.g., when no caller is speaking, and therefore with no interferences, the observation module 156 in the detection system 115 observes reflected tones 235 (e.g., due to impedance changes along the call path and reflections from the B-party 120). Referring briefly to FIG. 3, to observe the reflected tones, a sub-process starts 310 with one or more band pass and optional notch filters 158 in the detection system 115 filtering the reflected tones 315 to remove influences from various components within the call path, e.g., speech and background audio at the telephone of each party.

As the reflected tones are filtered, the signal character module 160, along with the inherent action of the communications network, sums the reflected tones 320 to provide a composite reflected tone.

The reflected tones are primarily from reflections at points of hybrids within a telephone communication system. The reflected composite signal has the same (or substantially the same) frequency components as the reference tone frequency components, although the individual reflected tones may have different phases. The detection system, e.g., observation module 156 and/or the signal characterization module 160, is further configured to observe and identify a particular tone characteristic (or trait) sought to be observed, e.g., a zero crossing for the composite reflected tone. This tone characteristic, e.g., zero crossing point, provides a static reference point from which changes in a tone can be observed as further described herein. Alternatively, the detection system can be configured to use other tone characteristics, e.g., inflection point, a waveform peak magnitude or waveform valley magnitude, as a static reference point to observe changes.

Figure 4:
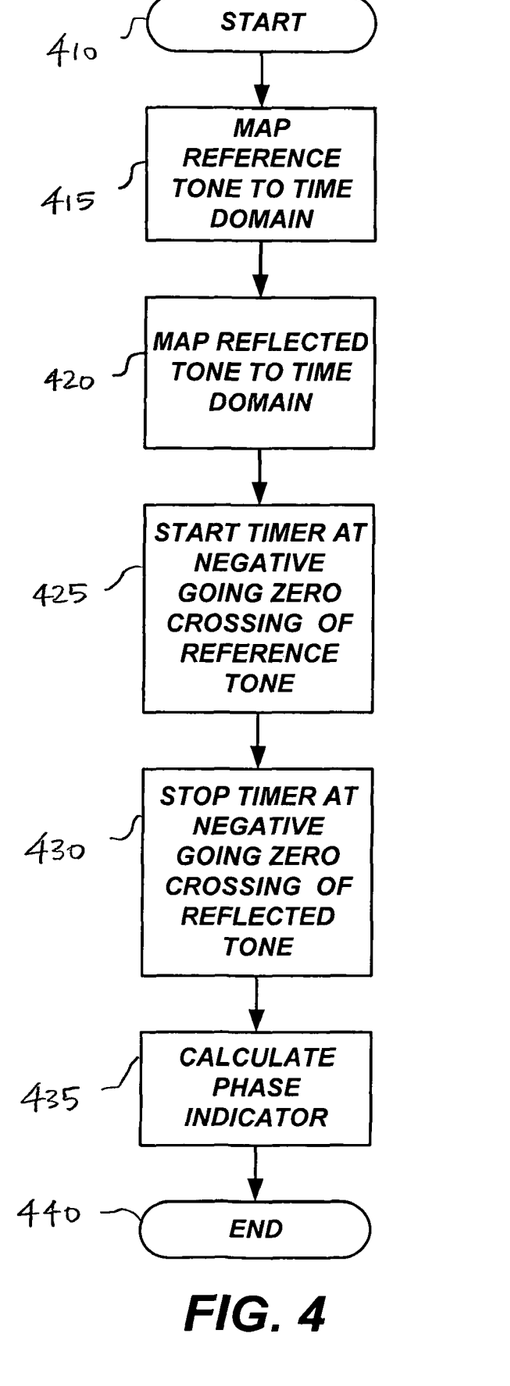

Turning back to FIG. 2, the relationship module 162 determines a relationship between the phase of the composite reflected tone with that of the reference tone, e.g., a phase indicator. Specifically, the relationship module 162 is configured to evaluate a time difference between the reference tone and the composite reflected tone. FIG. 4 illustrates an embodiment for this process.

Referring to FIG. 4, the process starts 410 and initially the frequency of the reference tone is mapped to a time domain 415 to determine its period so that, for example, a 200 Hz reference tone, would have between its similar zero crossings a time difference of 5 milliseconds (5 milliseconds using $t=1/f$). The composite reflected tone is also mapped to a time domain 420, but the mapping also takes into account the appropriate phase indicator, e.g., between 0 degrees (right on apparent phase) to almost back to zero (at just before 360 degrees). Those skilled in the art will appreciate that this phase difference indicator may not, and need not, accurately represent any actual time delay or phase shifts in the overall system, e.g., the system as illustrated in FIG. 1*a*.

With the reference tone and the reflected composite tone mapped to a time domain, the system begins to make a finite period of measurement based on the frequency in use. Specifically, the timer is started (or triggered) when a reference tone is for example, negative going at a zero crossing 425 and is stopped when a reflected composite tone is, for example, negative (or positive) going 430. The start and stop values may be stored in a state machine, a register, a memory, a storage device (e.g., optical, solid-state, or magnetic drive), or other storage mechanism. The statistical analysis module 166 uses the start and stop times to calculate a phase indicator 435 between the reference tone and the reflected composite tone.

Turning back to FIG. 2, over some set or predefined period of time data regarding this phase indicator is gathered and reported 245, e.g., by the report generator to a screen or to the storage mechanism. As phase indicator data is continually gathered, it may be stored and further used for additional analysis such as determining when there are "disturbances," e.g., phase difference using the gathered phase indicator data, further analysis may be done to calculate mean or median phase indicator values, which can then be used to evaluate relevant aberrations versus momentary aberrations in activity along the call path, e.g., as caused by components of the B-Partys voice that happen to coincide with similar components of the reference tone or tones.

Figure 5:
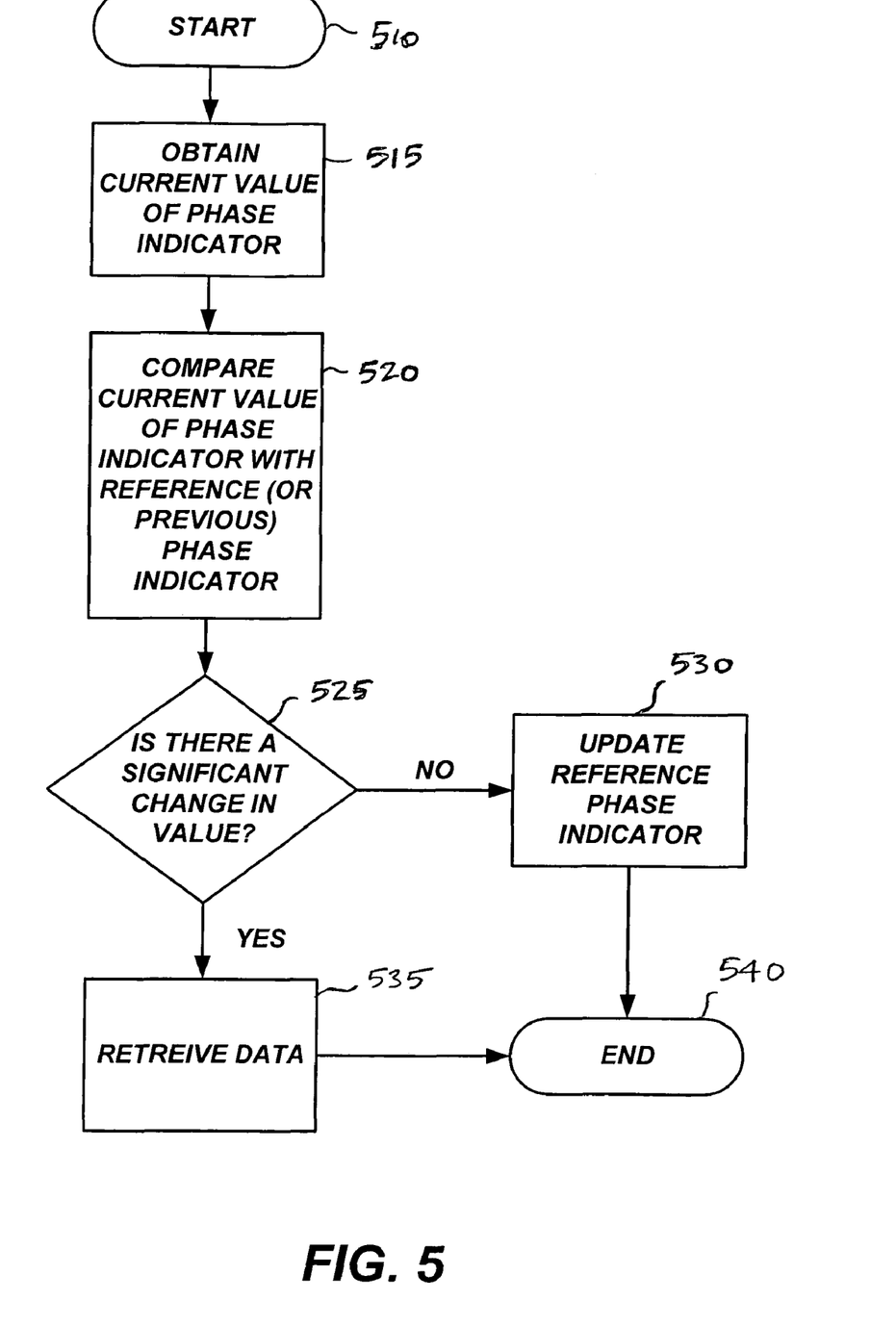
FIG. 5 illustrates one embodiment of a process for determining a significant phase change in a system in accordance with the present invention.

FIG. 5 illustrates one embodiment of a process for determining a significant phase change in a system in accordance with the present invention. The process starts 510 and obtains 515 a current value of a phase indicator. The process then compares 520 the current value of the phase indicator with a reference phase indicator. In one embodiment, the reference phase indicator may be a previous phase indicator relative to the current (or present) phase indicator.

Next, the process determines 525 if there is a significant change in phase indicator value as a result of the comparison. If not, the process updates 530 the reference phase indicators. If so, the process retrieves 535 data associated with this change for further action before ending 540. The further action may be, for example, an automated action to cut off a call or a request for manual action such as an inquiry of whether to cut off a call. In addition, it is noted that the process may be configured as a looping process.

In one embodiment, the present invention advantageously exploits a conventional 8000 Hz clock rate to implement a timer. As an example the above process can be described as described herein using a 250 Hz reference tone and an 8 kilosample per second sampling rate, which provides a scale of 32 points. The scale factor of 32 in this case is derived by dividing the sample rate by the reference tone frequency, e.g., 8000 Hz/250 Hz yields 32 possible values for the phase indicator (it is noted that this scale of 32 means that if the timer is clocked at the 8 kilosample clock rate the resulting phase indicator can have any of 32 integer values, in this case from 0 to 31 or from 1 to 32, depending upon how the timer start and stop mechanisms are implemented). Thus, the values of the phase indicator received are between 0 to 31 or 1 and 32, inclusive. It is noted that the principles of the present invention are also applicable with other clock rates.

In one embodiment an averaging algorithm is used to obtain a phase indicator value, e.g., a review of a sequence of readings over a predetermined period of time, such as 10 readings per second. As the phase indicator values are obtained (or received) by the system (e.g., of FIG. 1*f*), the values are checked to determine if a significant change has occurred relative to prior values. For example, if the phase indicator values are averaging 19, 19, 19, 19, 18, 19, 19, 18 and then suddenly go to an average of 14, 13, 14, 13, 14, 14 over a period of time, this may be construed (e.g., by predetermined configuration) by the system to be a significant change in value. In such instances, the system may be configured to take an automated or manual next step as previously described.

Functional Overview—Multi-Tone

Figure 6A:
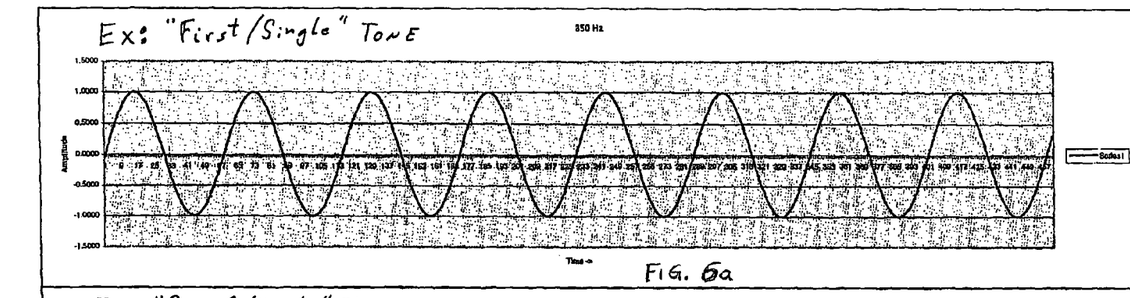
FIGS. 6a through 6c illustrate waveforms for use in a single or multi-tone configuration for monitoring a communication system for a characteristic changes in a call path in accordance with the present invention.
Figure 6B:
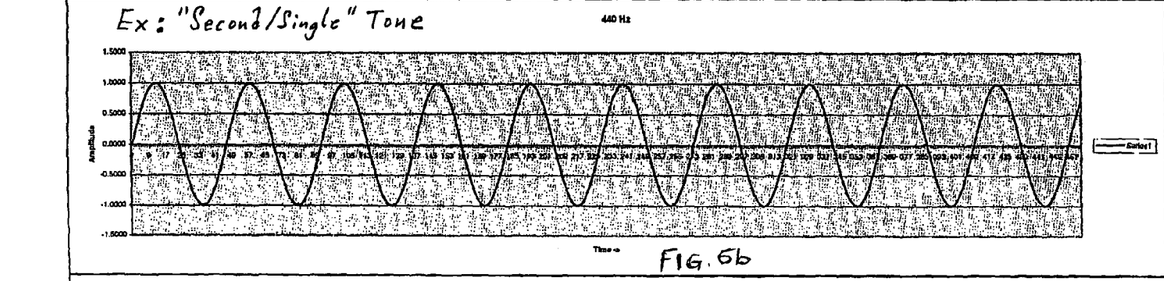
Figure 6C:
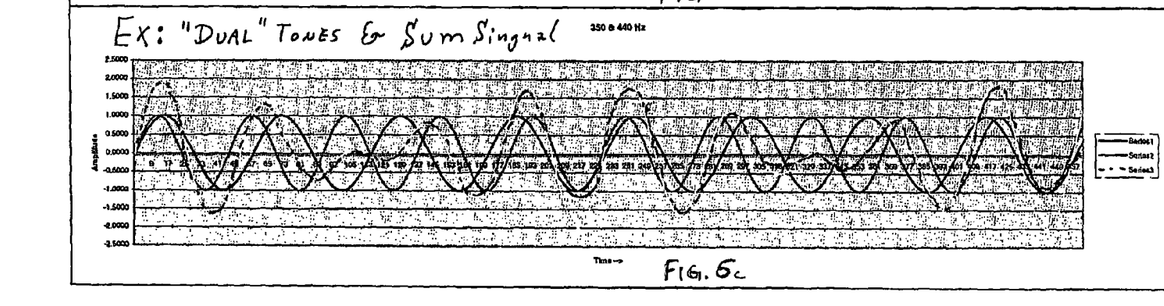

The system and process described to this point are also applicable for use in a multi-tone configuration. FIGS. 6*a* through 6*c* illustrate waveforms for use in a multi-tone configuration for monitoring a communication system for a characteristic changes in a call path in accordance with the present invention. By way of example, the multi-tone concept is illustrated through use of two single tones, one at 350 Hz and the other at 440 Hz, which are shown in FIGS. 6*a* and 6*b*, respectively. FIG. 6*c* illustrates the sum of the first single tone, e.g., at 350 Hz, and the second single tone, e.g., at 440 Hz, that produces a "dual tone" (i.e., two tones).

A purpose of the second single tone is twofold. A first purpose is to somewhat "mask" the first single tone so that neither the A-party 110 nor the B-party 120 perceives either tone in the course of their conversation. Although this example uses frequencies of 350 Hz and 440 Hz, any two frequencies for the tones may be selected so that inclusion of the two single tones in a call path is relatively non-intrusive to the callers, i.e., do not interfere with conversation and, thus, should be unnoticed by the parties.

Those skilled in the art will recognize that the resulting "difference tone", or beat frequency, will tend to dominate the callers subconscious attention as being non-interfering due to its low apparent frequency and that the single tone frequencies, and thus the difference frequency, may be selected to tend to mask the perception of the higher frequency single-tone signals and further tends to particularly mask the higher frequency single tone signal which could otherwise be the more intrusive signal as perceived by the callers (parties 110, 120).

A second purpose of the second single tone is to provide an overall longer time period over which the combined dual-tone waveform repeats. An example would be to use the single tone frequencies of 160 Hz and 200 Hz resulting in a beat/difference frequency of 40 Hz. Thus, while assuming the same 8000 samples per second the 160 Hz single tone would provide a scale of 50 points, and the 200 Hz single tone would provide a scale of 40 points but the combined dual-tone waveform provides a scale of 200 points. Stated differently, the case of a single 160 Hz reference tone would provide a resolution of one part in 50 or two percent. Likewise, the case of a single 200 Hz reference tone would provide a resolution of one part in 40 or two point five percent. But the resolution of the combined dual tone pair is one part in 200 or one-half percent.

Figure 7A:
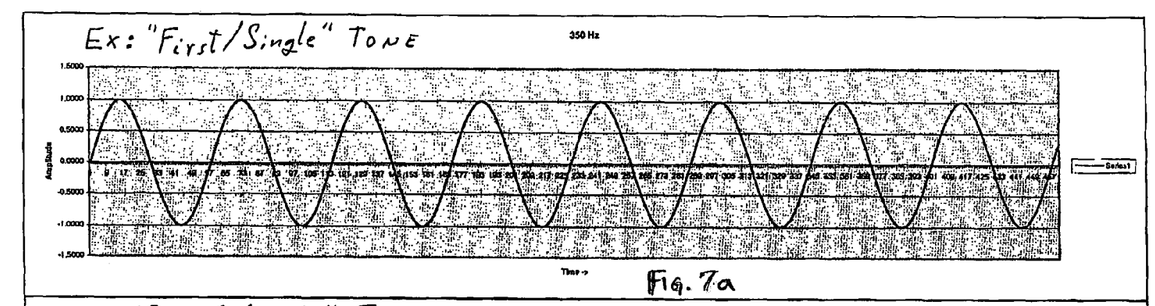
FIGS. 7a through 7c illustrate waveforms for use in a dual tone configuration and perception of the tones by a human ear in accordance with the present invention.
Figure 7B:
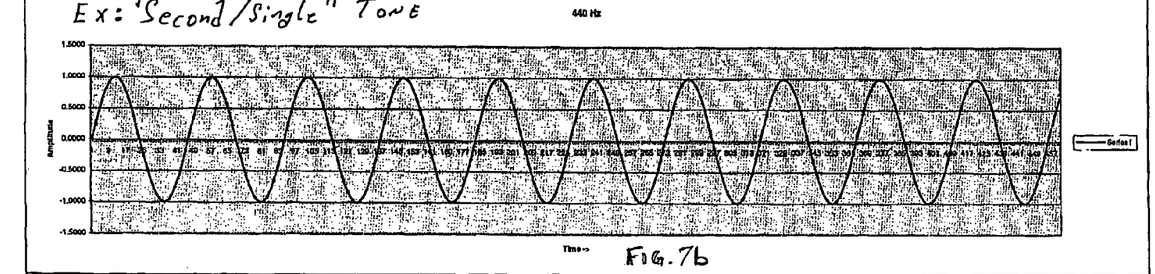
Figure 7C:
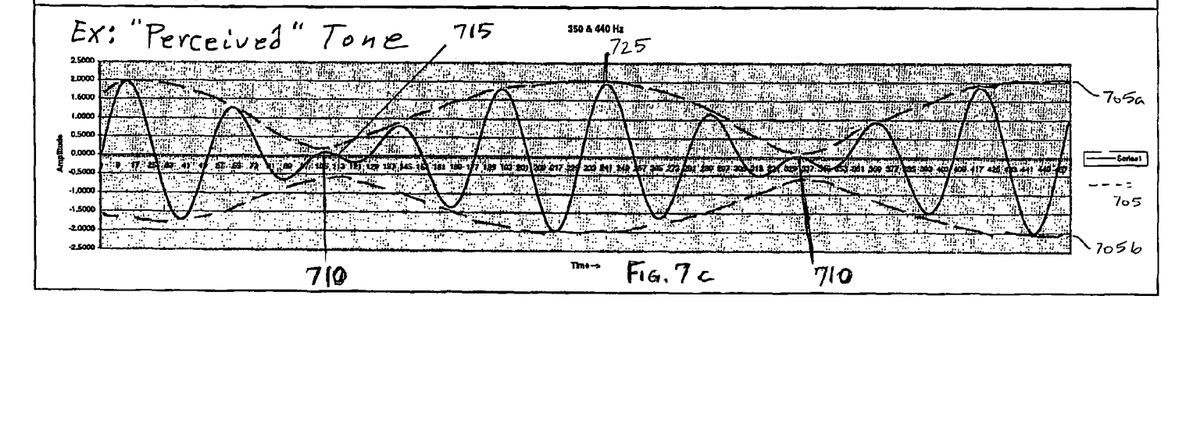

FIGS. 7*a* through 7*c* illustrate the "mask" concept using the first single tone of 350 Hz (shown in FIG. 7*a*) and the second single tone of 440 Hz (shown in FIG. 7*c*) as an example. Specifically, FIG. 7*c* illustrates what is the "perceived" tone from the perspective of the A-party 110 and the B-party 120.

Thus, from the perspective of monitoring the call path between the A-party 110 and the B-party 120, the perceived tone resulting from each single tone, e.g., 350 Hz and 440 Hz, provides an opportunity to observe particular signal characteristic such as inflection points, which are points at which there is a change in direction of a signal (e.g., positive going to negative going and vice versa). One example of an inflection point is a "tips" 710. In FIG. 7*c*, the tips 710 provide a uniquely identifiable characteristic of the waveform, which may be used to further analyze signal characteristics. For example, the tips 710 can be used in addition to, in lieu of, or in combination with the zero crossing data described previously to analyze and/or report about activity along the call path between the parties 110, 120.

In an alternative embodiment, an envelope 705 of the combined reflected tones resulting from the dual reference tones can be used for further analysis of signal characteristics. For example, referring again to FIG. 7*c*, reference point 715 illustrates a minimum of the envelope 705 while reference point 725 illustrates a maximum of the envelope. In one embodiment, the system can be configured to identify such points for appropriate analysis in determining changes in call characteristics.

It is noted that in some embodiments in accordance with the present invention, once a "characteristic" is selected than that characteristic of the reference tone or combined/composite reference tone would be used to start the timer and any appropriate characteristic of the reflected tone or composite reflected tone, consistent with the selected characteristic of the reference tone, would/could be used to stop the timer, e.g., a zero crossing near the minimum envelope of the combined reference tone could be used to start the timer and a "tip"/peak point (inflection point) of the combined/composite reflected tone could be used to stop the timer.

In addition, if a currently selected combination of characteristics being used to start and stop the timer "causes trouble," e.g., causes readings that fluctuate between "minimum scale" and "maximum scale" (e.g., an apparent "0" phase indicator) then the system could beneficially change to a different combination of characteristics in order to obtain timer readings somewhere else on its available scale of values. Thus, the "resulting phase indicator" need not bear any resemblance to an actual "phase measurement."

In addition, embodiments can be configured that allow for purely computational means to compensate for a selected combination of characteristics (to start and stop the timer) that "cause trouble," e.g., adding a fixed offset to all timer readings resulting in an "offset scale." Such embodiments can be employed advantageously, even if they may not be in the "range" of the scale provided by a raw timer based upon the sampling rate and selected tone/composite tone overall repetition rate.

Moreover, embodiments can be configured that allow for computational means to compensate for a selected combination of characteristics (to start and stop a timer) that "cause trouble," e.g., modulo addition of a fixed offset to all timer readings where the modulus is the same numerical value as that of the scale length as described previously as appropriate for the particular embodiment. An example would be a scale length of 32 where a sequence of timer readings such as 32, 1, 1, 32, 31, 32, 1, 32 appears to be troublesome for simple subtraction to see the true nature of the sequence. However, adding some fixed value, where the actual value added is arbitrary, modulo 32 (in this example) clarifies the situation. In another example, adding the offset value of 5, modulo 32, to the example sequence results in the clarified sequence of values 5, 6, 6, 5, 4, 5, 6, 5.

The present invention advantageously provides a system and a method to detect activity along a call path, e.g., hookflash to incorporate a C-party 115 in a call between an A-party 110 and a B-party 120. By observing and monitoring one or more reference tones along a call path, the system and the method beneficially can track, monitor, and report activity along a call path without being intrusive to parties along a call path. Moreover, most callers would be unlikely to detect the monitoring activity through the disclosed embodiments. Hence, the present invention provides monitoring and reporting security that prevents calling parties from engaging in opportunities to bypass such detection.

It is noted that in general each of the reference tone frequencies, and thus the reflected tone frequencies, can be within the frequency range limited by a lowest frequency that the telecommunications systems will pass without significant degradation, as well as the "low" end of primary communication/speech energy frequencies. In many systems, for example, in many non-U.S. countries, the low end of an "official" telecommunications network is defined to be 200 Hz. Lower frequency energy will still be carried, although there may be some impairment. In other systems, for example, many systems in the U.S., the official low end is defined to be 300 Hz, although in practice the low end frequency capability of the U.S. network actually is similar to the rest of the world.

The upper, but relatively low, frequency limit may be chosen with more practical view. In one embodiment, a frequency is selected that is not the same as those considered important carriers of speech information as that frequency (or frequencies) may be removed through the notch filter(s). For example, customer/user signaling frequency pairs may be as follows:

350 & 440—Dialtone (beat frequency=90 Hz),
440 & 480—Ringback (beat frequency=40 Hz),
480 & 620—Busytone (beat frequency=120 Hz).

In the example above, it is noted that all component frequencies are above the old/established "300 Hz" limit. In general, in some embodiments the reference tones may be selected from the same frequency range.

Upon reading this disclosure, those of skill in the art will appreciate still additional alternative structural and functional designs for a system and a process for activity detection in a call path by monitoring phase-related information of signals along the call path through the disclosed principles of the present invention. Thus, while particular embodiments and applications of the present invention have been illustrated and described, it is to be understood that the invention is not limited to the precise construction and components disclosed herein and that various modifications, changes and variations which will be apparent to those skilled in the art may be made in the arrangement, operation and details of the method and apparatus of the present invention disclosed herein without departing from the spirit and scope of the invention as defined in the appended claims.

What is claimed is:

1. A method of detecting activity during a phone call, the method comprising:
    establishing a call path between a first party and a second party;
    adding a first reference tone of a first repetitive waveform to a first electrical signal from the first party to the second party via the call path, wherein the first reference tone has a frequency less than 300 Hz;
    receiving a second electrical signal from the second party to the first party via the call path, the second electrical signal including a reflected tone of a second repetitive waveform, the second repetitive waveform representing the first reference tone reflected from the call path; and
    detecting change in a phase difference between the first reference tone in the first electrical signal and the reflected tone in the second electrical signal.

2. The method of claim 1, wherein the activity detected during the call comprises a three-way call attempt or a call transfer attempt.

3. The method of claim 1, wherein detecting the change in the phase difference comprises determining a zero crossing of the reflected tone.

4. The method of claim 3, wherein detecting the change in the phase difference comprises determining a zero crossing for the first reference tone.

5. The method of claim 1, wherein the frequency of the first reference tone is fixed.

6. The method of claim 1, further comprising adding a second reference tone in the first electrical signal, the second reference tone in combination with the first electrical signal generating a first envelope in the first electrical signal and a second envelope in the reflected tone.

7. The method of claim 1, further comprising reporting information related to change in the phase difference.

8. The method of claim 1, further comprising reporting activity associated with the phone call.

9. The method of claim 8, wherein the step of reporting activity comprises flagging the phone call.

10. The method of claim 8, further comprising, in response to the step of reporting activity, one of generating a warning associated with the phone call, recording the phone call, and terminating the phone call.

11. The method of claim 1, wherein the phase difference is determined by comparing one of zero crossings, minimum reference points, and maximum reference points of the first reference tone and one of zero crossings, minimum reference points, and maximum reference points of the reflected tone.

12. The method of claim 1, wherein detecting change in the phase difference comprises:
    starting a timer responsive to detecting a first point of the first repetitive waveform;
    stopping the timer responsive to detecting a second point of the second repetitive waveform;
    determining a first phase indicator based on a start time and a stop time of the timer; and
    comparing the first phase indicator with a reference phase indicator.

13. The method of claim 12, wherein the first point is one of zero crossing point, a minimum reference point and maximum reference point of the first repetitive waveform; and the second point is zero crossing point, a minimum reference point and maximum reference point of the second repetitive waveform.

14. A method of detecting activity during a phone call, the method comprising:
    establishing a call path between a first party and a second party;
    adding a first reference tone of a first repetitive waveform to a first electrical signal from the first party to the second party via the call path, wherein the first reference tone has a frequency less than 300 Hz;
    adding a second reference tone to the first electrical signal of a second repetitive waveform, the second reference tone in conjunction with the first reference to generating a first tone envelope in the first electrical signal;
    receiving a second electrical signal from the second party to the first party via the call path, the second electrical signal including a second tone envelope including a third repetitive waveform, the second tone envelope representing the first tone envelope reflected from the call path; and
    detecting change in a phase difference between the first tone envelope in the first electrical signal and the second tone envelope in the second electrical signal.

15. The method of claim 14, wherein detecting the change in the phase difference comprises comparing inflection points of the first tone envelope and the second tone envelope.

16. The method of claim 14, wherein detecting the change in the phase difference comprises comparing one of minimum reference points and maximum reference points in the first tone envelope and the second tone envelope.

17. The method of claim 14, wherein detecting the change in the phase difference comprises analyzing zero crossings of the first tone envelope and the second tone envelope.

18. The method of claim 14, wherein the frequency of the first reference tone is fixed.

19. The method of claim 14, further comprising reporting information related to the change in the phase difference.

20. The method of claim 14, further comprising reporting activity associated with the phone call.

21. The method of claim 20, wherein reporting the activity comprises flagging the phone call.

22. The method of claim 20, further comprising, in response to the step of reporting activity, one of generating a warning associated with the phone call, recording the phone call, and terminating the phone call.

23. The method of claim 14, wherein the phase difference is determined by comparing one of zero crossings, minimum reference points, and maximum reference points of the first tone envelope and one of zero crossings, minimum reference points, and maximum reference points of the second tone envelope.

24. The method of claim 14, wherein the activity detected during the call comprises a three-way call attempt or a call transfer attempt.

25. The method of claim 14, wherein detecting change in the phase difference comprises:
- starting a timer responsive to detecting a first point of the first repetitive waveform;
- stopping the timer responsive to detecting a second point of the second repetitive waveform;
- determining a first phase indicator based on a start time and a stop time of the timer; and
- comparing the first phase indicator with a reference phase indicator.

26. The method of claim 25, wherein the first point is one of zero crossing point, a minimum reference point and maximum reference point of the first repetitive waveform; and the second point is zero crossing point, a minimum reference point and maximum reference point of the second repetitive waveform.

27. A system for detecting activity during a phone call, the system comprising:
- a reference tone generator configured to generate a first reference tone of a first repetitive waveform;
- a summing module configured to add the first reference tone to a first electrical signal from a first party to a second party via an established call path;
- an interface configured to receive a second electrical signal from the second party to the first party via the call path, the second electrical signal including a reflected tone of a second repetitive waveform, the second repetitive waveform representing the first reference tone reflected from the call path, wherein the first reference tone has a frequency less than 300 Hz; and
- a detection module configured to determine a change in a phase difference between the first reference tone in the first electrical signal and the reflected tone in the second electrical signal.

28. The system of claim 27, wherein the reference tone generator is further configured to generate a second reference tone, the summing module is further configured to add the second reference tone to the first electrical signal to generate a first tone envelope.

29. The system of claim 28, wherein the first reference tone is between 150 and 600 Hz.

30. The system of claim 27, wherein the reflected tone is under 300 Hz.

31. The system of claim 27, wherein the phase difference is detected by a zero crossing of the first reflected tone and a zero crossing of the reflected tone.

32. The system of claim 27, wherein the phase difference is determined by comparing inflection points of the first reference tone and the reflected tone.

33. The system of claim 27, wherein the phase difference is determined by comparing one of minimum reference points and maximum reference points in the first reference tone and the reflected tone.

34. The system of claim 27, wherein the phase difference is determined by comparing one of zero crossings, minimum reference points, and maximum reference points of the first reference tone and one of zero crossings, minimum reference points, and maximum reference points of the reflected tone.

35. The system of claim 27, wherein the activity detected during the call comprises a three-way call attempt or a call transfer attempt.

36. The system of claim 27, wherein the detection module is further configured to:
- start a timer responsive to detecting a first point of the first repetitive waveform;
- stop the timer responsive to detecting a second point of the second repetitive waveform;
- determine a first phase indicator based on a start time and a stop time of the timer; and
- compare the first phase indicator with a reference phase indicator.

37. The system of claim 36, wherein the first point is one of zero crossing point, a minimum reference point and maximum reference point of the first repetitive waveform; and the second point is zero crossing point, a minimum reference point and maximum reference point of the second repetitive waveform.

* * * * *